Patented Apr. 18, 1933

1,904,148

UNITED STATES PATENT OFFICE

WILHELM LENZ, OF WIESBADEN-BIEBRICH, AND KURT JOCHUM, OF FRANKFORT-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR ACCELERATING THE RETTING OF FLAX

No Drawing. Application filed July 11, 1929, Serial No. 377,603, and in Germany July 16, 1928.

The present invention relates to a process for accelerating the retting of flax.

One of the oldest operations to be carried out in the textile industry is the disintegration of flax-straw by some fermentation process. This process is effected either by storing the flax-straw in the open field, that is to say by dew-retting, or the straw is placed into stagnant or slow-running water, this process being called "water-retting". In each case a series of successive fermentation processes takes place, whereby the incrusts which enclose the vegetable fibre bundles are resolved by fermentation almost to the pectins. It is not quite certain to what extent also the lignins are affected thereby, but we may suppose that part of these substances is likewise resolved by the fermentation. The fibre, which chiefly contains only fatty acids and resin acids, peels off from the ligneous stem and is subjected to the further known operations (such as breaking, hackling, combing or the like).

For a long time attempts have been made to shorten the duration of this fermentation process and especially to suppress the detrimental secondary fermentation which often occurs. A chemical method, which works with an alkaline or acid disintegration, has hitherto not been applied on a large scale. The researches on the bacteriological aspect of the retting process have led to the discovery of a series of bacteria cultures, which are recommended as substances to be added to the retting liquid. However the results thereby obtained are of little utility for practical purposes.

This is due to the fact that according to the said researches a certain bacillus has been regarded as decisive for the retting process and that, therefore, there have only been used cultures of this one bacillus. It has, however, been proved that the retting process proceeds satisfactorily and above all quickly, only when a series of different bacteria which are adapted to each other act concurrently and jointly upon the flax-system. On the basis of these novel results it has been possible to cultivate out of normal flax-rettings those different species of bacteria the combination of which guarantees the best and quickest possible fermentation.

The new process consists in introducing into the natural retting process a suitable combination of the different species of bacteria which have been selected according to their specific suitability. We have found that those breeds of bacteria are suitable for the purpose in question, which are capable of causing fermentation of cane sugar, such as for instance the bacteria of the coli group and the gemmiparous fungi (also called budding fungi), which may, for instance, be cultivated from flax-stems and furthermore the bacteria of the mesentericus group. Since, however, the disturbances in the course of the retting process cannot in general be ascribed to the fact that all of the said groups of bacteria are lacking, but rather to the fact that one or several of them are absent or replaced by homogeneous but less efficacious bacteria, the retting can in such cases be improved to a maximum, if it can be ascertained by bacteriological researches which specific breed of bacteria is absent. Generally speaking it is preferable also in this case to use a mixture of strains of bacteria which are preferably adapted to each other because in this manner any possible error in the natural composition of the retting is compensated.

In order to carry out the process there are cultivated out of a great number of rettings first those kinds of bacteria, which play an important part in the course of the retting process. Alone and combined with other cultures, the different cultures thus obtained are then tested as to their retting effect by means of artificial rettings with degerminated linen-stems, so that the most useful combination can be determined.

It has been proved that it is advantageous to add to the combination both bacteria of the mesentericus group and the bacteria of the coli group which form and those which do not form indols and finally gemmiparous fungi, while the breed which is the most efficacious in each case is selected as above described from a series of homogeneous breeds.

The bacteria cultures thus obtained are cultivated in the usual manner on nutrient media, preferably while using decoctions from linen-fibres. There are then used either those liquid cultures which contain the bacteria along with their ferments or the species of bacteria which have been obtained by means of solid nutrient media.

The following examples serve to illustrate the invention, but they are not intended to limit it thereto.

(1) Linen-stems are boiled or extracted. The extracted substance thus obtained, which serves as nutrient medium, is added to a retting and the latter is then analyzed by one of the bacteriological methods. It is thus found that an enormous quantity of aerobic as well as anaerobic bacteria cause the retting. A selection is made especially from the gemmiparous fungi or from the bacteria of the coli or mesentericus group, the bacteria so selected are bred on a decoction of the flax-stems so as to obtain a pure culture thereof. By combination of different species of coli bacteria, gemmiparous fungi and bacteria of the mesentericus group, a mixture of different bacteria is obtained which, when added to the natural flax-rettings, cause a considerable improvement of the retting process and reduction of its duration.

(2) Small quantities varying from 0.1 to 0.2 gr. of the cultures bred as indicated in Example (1) are added to the retting bacteria and the temperature is kept between 28° C.–32° C. Of course there may be added also greater quantities for accelerating the fermentation and, if required, the temperature may be kept at a lower degree, whereby the fermentation is retarded, but the dissolved substances will be extracted just as well. After 2–4 days well disintegrated flax-stems of a light colour are obtained. Each of the subsequent retting operations can be carried out with a gradually decreasing amount of additional bacteria, because the basins are completely occupied by the active breeds.

We claim:

1. Process for accelerating the flax-retting process, which consists in adding to the retting liquid a mixture of bacteria of the mesentericus group and of different bacteria capable of causing fermentation of cane sugar.

2. Process for accelerating the flax-retting process, which consists in adding to the retting liquid a mixture of budding fungi, bacteria of the coli group and bacteria of the mesentericus group.

3. Process for accelerating the flax-retting process, which consists in adding to the retting liquid a mixture of budding fungi cultivated from flax-stems, bacteria of the coli group and bacteria of the mesentericus group.

4. Process for accelerating the flax-retting process, which consists in adding to the retting liquid a mixture of budding fungi cultivated from flax-stems, bacteria of the coli group cultivated from flax-stems, some of which are capable and some incapable of forming indols and bacteria of the mesentericus group.

5. Process for accelerating the flax-retting process, which consists in adding to the retting liquid a mixture of budding fungi cultivated from flax-stems, bacteria of the coli group cultivated from flax-stems, some of which are capable and some incapable of forming indols, and bacteria of the mesentericus group cultivated from flax-stems.

In testimony whereof, we affix our signatures.

W. LENZ.
KURT JOCHUM.